United States Patent [19]
Chen et al.

[11] Patent Number: 5,822,506
[45] Date of Patent: Oct. 13, 1998

[54] SELECTABLE MODIFICATION OF MEDIUM IN A PRINTER SYSTEM

[75] Inventors: Weilin Chen, Longmont; Reinhard Heinrich Hohensee, Boulder; James Warden Marlin, Longmont; Jagdish Mooljee Nagda, Boulder; Frankie Sherwood Shook; David Earl Stone, both of Longmont, all of Colo.

[73] Assignee: International Business Machines Corporation, Armonk, N.Y.

[21] Appl. No.: 144,848

[22] Filed: Oct. 28, 1993

[51] Int. Cl.⁶ .............................. G06F 15/00; H04N 1/21
[52] U.S. Cl. .............................................. 395/114; 395/375
[58] Field of Search ...................................... 395/100, 101, 395/110, 114, 117, 325, 275, 375, 148, 149, 118; 358/448, 498; 382/178, 205, 266

[56] References Cited

U.S. PATENT DOCUMENTS

| | | | |
|---|---|---|---|
| 5,018,078 | 5/1991 | Urabe et al. | 364/518 |
| 5,060,980 | 10/1991 | Johnson et al. | 283/70 |
| 5,075,875 | 12/1991 | Love | 395/117 |
| 5,095,369 | 3/1992 | Ortiz et al. | 358/296 |
| 5,107,339 | 4/1992 | Bertoni et al. | 358/296 |
| 5,152,511 | 10/1992 | Shido et al. | 270/53 |
| 5,163,122 | 11/1992 | Urabe et al. | 395/109 |
| 5,221,973 | 6/1993 | Miller et al. | 358/468 |
| 5,243,381 | 9/1993 | Hube | 355/204 |

FOREIGN PATENT DOCUMENTS

61-18674  1/1986  Japan.
04290766  10/1992  Japan.

*Primary Examiner*—Edward L. Coles, Sr.
*Assistant Examiner*—Gabriel I. Garcia
*Attorney, Agent, or Firm*—Homer L. Knearl; Saul A. Seinberg

[57] ABSTRACT

A computer-controlled printing system includes a host computer, an intelligent printer and an intelligent post printer processor. The print job is controlled by defining print data, printer control data and printer post processor control data in a print data stream from the host computer. The print data and printer control data are read at the intelligent printer. The intelligent printer executes the print control data to print the print data on a print medium. The printer also determines if there is post processor control data in the print data stream and, if so, sends the post processor control data from the printer to the intelligent post processor. The post processor reads the post processor control data, and executes the post processor control data to perform selected modification of the print medium. Selectable modifications of the print medium at the post processor include predetermined fixed printing of images, symbols or text, perforation of the print medium, cutting of the print medium, or user defined modifications of the print medium.

19 Claims, 6 Drawing Sheets

FIG. 6

| OFFSET | TYPE | NAME | RANGE | MEANING | REQUIRED |
|---|---|---|---|---|---|
| 0-1 | CODE | ORDER CODE | X'0E00' | SELECT MEDIUM MODIFICATIONS (SMM) ORDER CODE | X'0E00' |
| 2-9 | | | X'0...00' | RESERVED | |
| ZERO OR MORE ENTRIES IN THE FOLLOWING FORMAT: | | | | | |
| +0-1 | UBIN | LENGTH | X'0005' - X'7FEE' | LENGTH OF THE ENTRY, INCLUDING THIS FIELD | X'0005' |
| +2 | CODE | TYPE | X'00' X'01' X'02' | INHIBIT MEDIUM MODIFICATION APPLY MEDIUM MODIFICATION INHIBIT ALL MEDIUM MODIFICATIONS | X'00' X'01' X'02' |
| +3-4 | CODE | MODIFICATION ID | SEE BYTE DESCRIPTION | MODIFICATION ID | AT LEAST ONE MODIFICATION ID |
| +5 - end | UNDF | MODIFICATION PARAMETERS | SEE BYTE DESCRIPTION | ZERO OR MORE BYTES OF MEDIUM-MODIFICATION PARAMETERS | SEE BYTE DESCRIPTION |

SELECTABLE MODIFICATION OF MEDIUM IN A PRINTER SYSTEM

BACKGROUND OF THE INVENTION

1. Field of the Invention

This invention is directed to a method and apparatus for selectable control of post-print processing functions in a printer system via user controlled application program. More particularly, the invention provides for selectable control of modifications to the print medium in a print job controlled from a print data stream where an intelligent post-printer processor is controlled via an intelligent printer data stream.

2. Description of Prior Art

In computer controlled high-volume printing operations, the computer typically controls a high speed printer, such as the IBM 3835. The printer may perform functions such as cutting sheets, collating sheets, stapling collated sheets, and binding documents. The print functions and sheet handling functions at the printer and sheet handling functions at the post processor have been handled as a single print job.

More recently, data processors have been post-printer processors and, thus, creating intelligent post processors. These intelligent post processors have some conventional medium handling functions, such as cutting or perforating the medium, and have also added enhanced medium modification functions. These enhanced functions include printing predetermined fixed information such as images, symbols or text at predetermined locations on printed sheets or pages. Also this fixed information may be printed in selectable colors. An example of an application of this post-printer fixed printing is the printing of a company logo on the printed sheets. Exemplary of such a post-print processor is the Color Imprinter post processor, a product of BESTE Bunch.

To date, intelligent post processors have not been controlled by the print data stream controlling the printer. The printing system prints the documents, and the printed documents are moved to the post-printer processor for the additional printing of fixed messages, symbols, or logos, on the printed sheets.

The prior art includes printers, as shown in U.S. Pat. Nos. 5,018,078 and 5,163,122, that disclose an image processing system in which images, as well as text, are interactively edited and processed as a block for printing. In addition, U.S. Pat. No. 5,060,980 discloses a computer-based print form design tool. A user can create a form, or edit a form, by choosing from a variety of alphanumeric, graphic or image fields. U.S. Pat. No. 5,075,875 discloses a control system that enables forms with logos to be downloaded to a raster image processor in a laser printer. JP 61-018674 discloses an image-forming machine that is equipped to perform perforation and sorting. JP 04-290766 discloses printer control of the cutting position of paper. None of the above prior art references address the complete print job control where printed text is printed by the printer and the printed sheets are modified by an intelligent post processor controlled from print data stream.

SUMMARY OF THE INVENTION

A primary object of this invention is to provide print-job controls for a print system having a printer and a post-printer processor that alters the print medium, whereby the printer and post processor can be connected both from the standpoint of sheet flow and function control.

A second object of this invention is to provide a print job control system that may be easily adapted to add additional post-printer medium modifications available in the future.

In accordance with this invention, the above objects are accomplished by a computer controlled printing system having a host computer, an intelligent printer and an intelligent post printer processor. The print job is controlled by defining print data, printer control data and post processor control data in a print data stream from the host computer. The print data and printer control data are read at the intelligent printer. The intelligent printer executes the print control data to print the print data on a page or sheet of print medium. The printer also determines if there is post processor control data in the print data stream and, if so, sends the post processor control data from the printer to the intelligent post processor. The post processor reads the post processor control data, and executes the post processor control data to perform selected modification of the print medium.

Selectable modifications of the print medium at the post processor include printing of predetermined fixed information such as images, symbols or text, perforation of the print medium, cutting of the print medium, or user defined modifications of the print medium. The post processor, when executing the post processor control data, might select a specific fixed printing plate and a specific color for the fixed printing plate. The post processor would then print on the print medium with the specific fixed printing plate using the specific color.

Other objects, advantages and features of the invention will be understood by those of ordinary skill in the art after referring to the complete written description of the preferred embodiments in conjunction with the following drawings.

BRIEF DESCRIPTION OF THE DRAWINGS

FIG. 6 shows the format of the select medium modification command.

DESCRIPTION OF THE PREFERRED EMBODIMENTS

Figure 1:
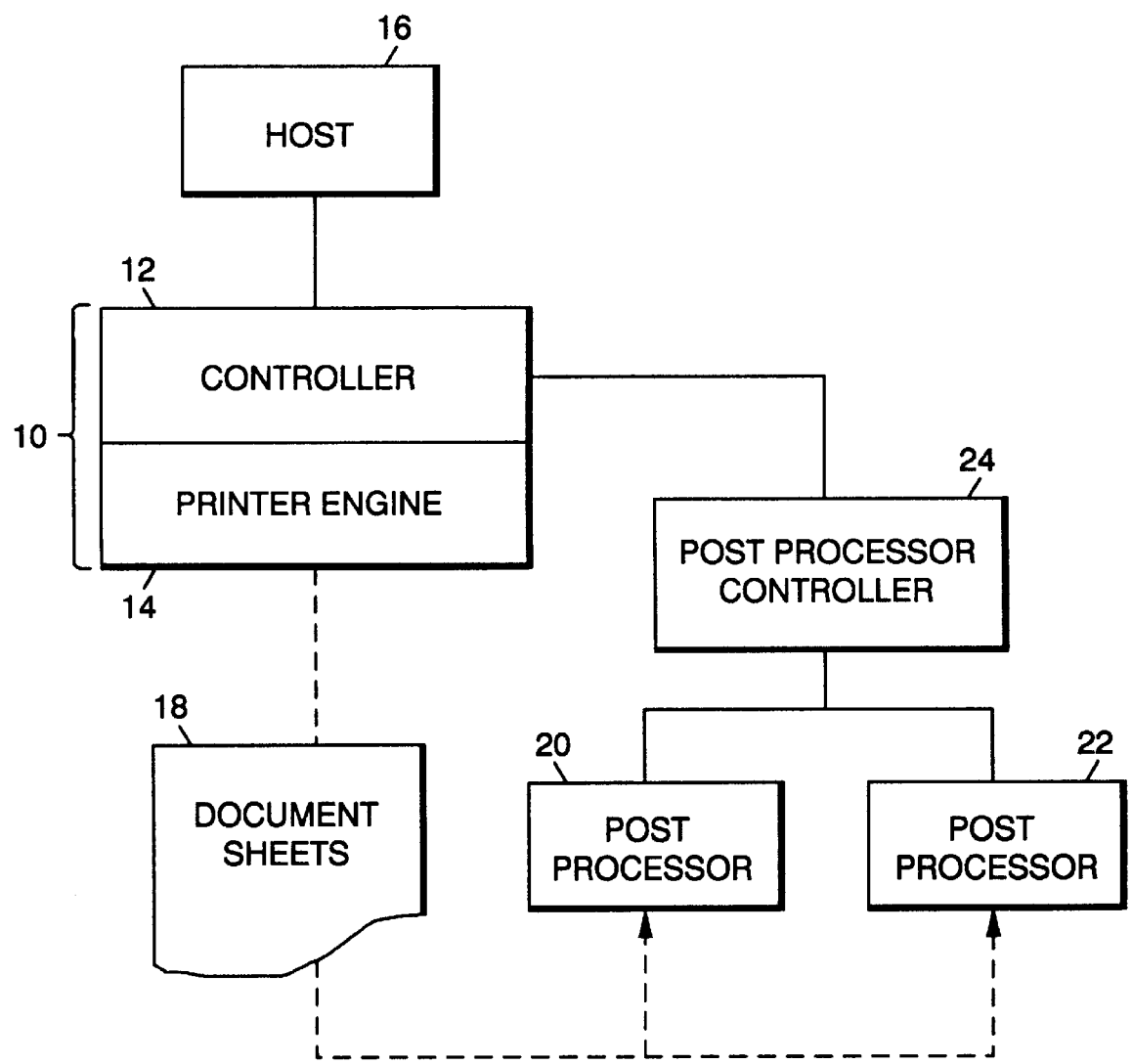
FIG. 1 shows the preferred embodiment of the printing system, including a host computer, an intelligent printer and an intelligent post printer processor.

The preferred embodiment of the invention is implementing printer system hardware, as depicted in FIG. 1. Printer 10 is a high speed, high volume printer, such as the IBM 3900 High Speed Printer. The IBM 3900 includes a controller 12 with a data processor to receive image data, code data and printer command. Controller 12 executes the printer commands to drive the printer engine 14 to print image, graphics and code data (text) on sheets of a document being printed.

Printer 10 is driven by a host computing system 16, such as MVS running on an IBM 3090 data processing system.

Other operating systems, such as the OS/400 running on an AS/400, could also be used to drive printer 10.

Sheets or pages 18 from printer 10 are usually in the form of continuous paper medium. The sheets are passed to post-printer processor 20 or 22 for perforation and fanfolding, cutting and stacking, and color printing on one, or both, sides of the printed sheets. The post processors are controlled by post processor controller 24. Controller 24 receives post processing commands, or operation identifiers, from controller 12 in printer 10. Controller 24, in effect, provides intelligent post processing at post processor 20 or 22. Intelligent post printer processors receive operation identifiers and act on the identifiers under control of the host 16 via controller 12 to produce a finished document. Exemplary of an intelligent post processor is the Color Imprinter by Beste Bunch which includes one post processor and post processor controller.

In an example application, a host IBM 3090 system might drive an IBM 3900 printer with a Beste Bunch Color Imprinter post processor to print invoices. The data for the invoices and the print commands, plus the operation identifiers for the post processor, would be in the print data stream from host 16 to printer 10. Printer 10 would print each invoice as sheets or pages on a continuous paper medium 18. The paper medium would be fed from printer 10 to post processor 20, and the post processor operation identifiers would be passed from printer controller 12 to post processor controller 24. Under the control of controller 24, post processor 20 would print a color logo on each invoice, perforate the paper between pages and refold or fanfold the paper as it exits from the post processor or cut the paper between sheets to separate the sheets.

Figure 2:
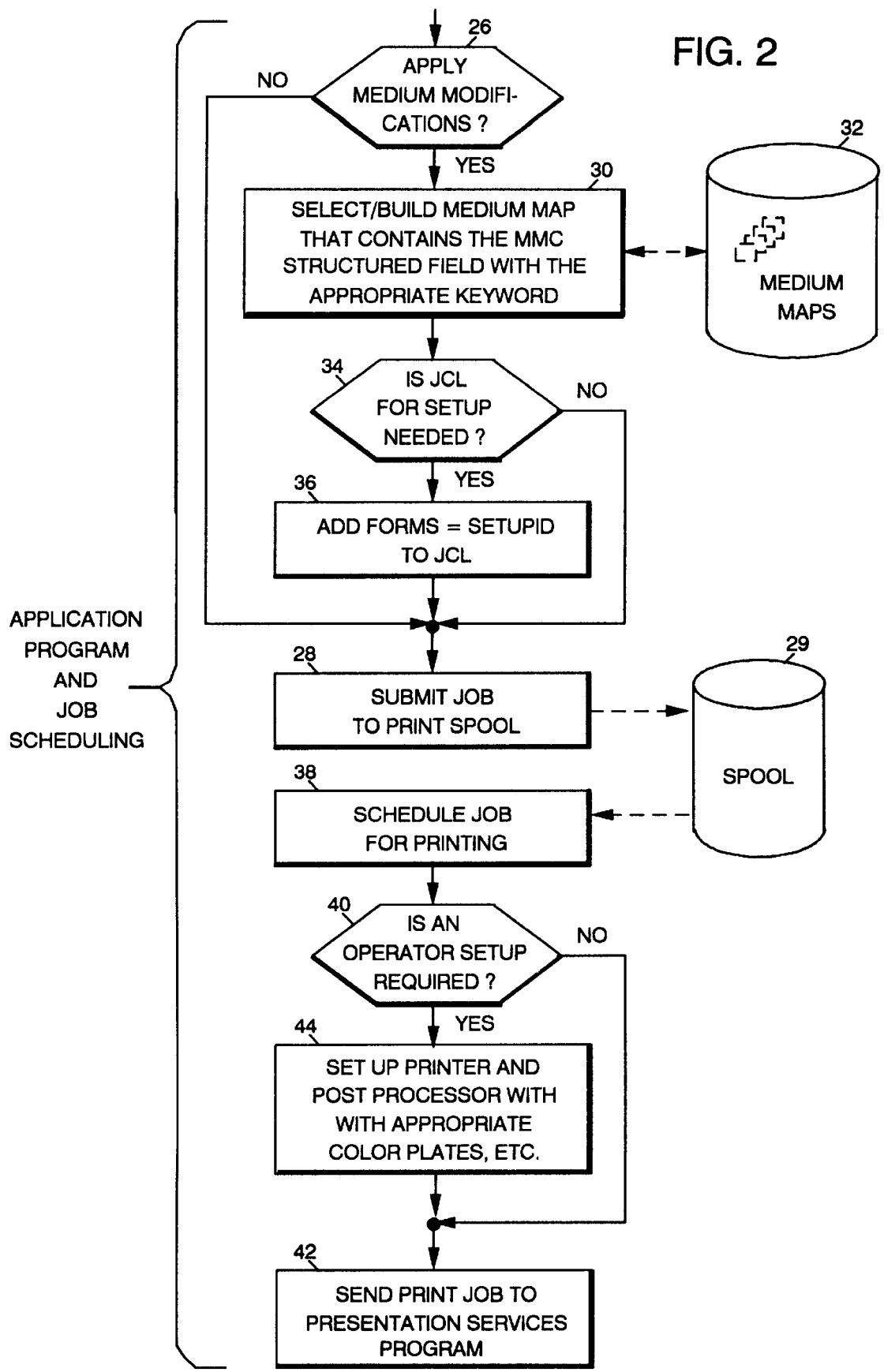
FIG. 2 shows portions of an application program and job scheduling program running in the host computer to set up the printing system.

In FIG. 2, the logical operations or process flow for an application program and job scheduling are shown for implementing the selection of modifications to the print medium at the post printer processor. Decision block 26 asks whether the application program is to apply medium modifications. If there are no medium modifications, the process branches to operation 28 where the print job is submitted to the print spool 29. If there are medium modifications to be applied, the operations branch yes to operation 30.

In operation 30, the process selects a medium map from storage 32. Each medium map uses Medium Modification Control (MMC) structured fields to specify the operations to be performed on the medium; i.e., the paper. MMC structured fields contain operation identifiers in the form of two-byte keywords to define operations in the printing system. MMC structured fields are described in an IBM reference manual entitled "Mixed Object Document Content Instruction Reference" (IBM Publication # SC31-6802-02). Keywords are used to identify the medium modification being selected. To date, MMC structured fields have been used to perform certain medium control operations in a printer. These operations have included input paper bin selection, overlay printing on each sheet or page, simplex or duplex printing, offset stacking for job separation, text suppression in printing, print quality selection, constant forms printing, etc.

The MMC structured fields in the present invention are also used to control the post-printer processor. Four new MMC keywords are introduced to identify operations to be performed by the intelligent post processor. These keywords are:

X'A0nn' Fixed information for medium:
X'nn' Selects fixed information medium modification; note: X'FF' will select all fixed information medium modifiers.

X'A100' Fixed perforation:
A perforation will be cut into the sheet at a fixed location.

X'A200' Fixed separation cut:
The sheet will be cut at a fixed location.

X'B0nn' User-defined medium modification:
X'nn' selects user defined modification.

The application program, in operation 30, may also build a medium map with the appropriate MMC structured fields if the desired map is not available in storage 32. After a medium map is selected, or built, decision operation 34 tests the keywords to determine if a Job Control Language (JCL) setup is needed. The JCL setup would define instructions to an operator to modify the post processor. The instructions might be to change paper cutting knife positions, change color plate used in fixed printing, etc. If the setup is not needed, the process branches to operation 28, and the job is submitted to the print spool 29. If setup is needed, the operation 36 specifies the operator instructions by adding "Forms =SETUPID" to the JCL list. The SETUPID identifies the operator setup required. After specifying the setup in the SETUPID, the process proceeds to operation 28, and operation 28 submits the print job to print spool 29.

While jobs are being submitted to the print spool, operation 38 begins to schedule each job for printing. Decision operation 40 checks the JCL list to determine if operator setup of the printer or the post processor is required. If no hardware setup is required, operation 42 sends the print job to the presentation services program. If hardware setup is required, the operator performs the hardware setup operations at step 44, and then operation 42 sends the print job to the presentation services program.

Figure 3:
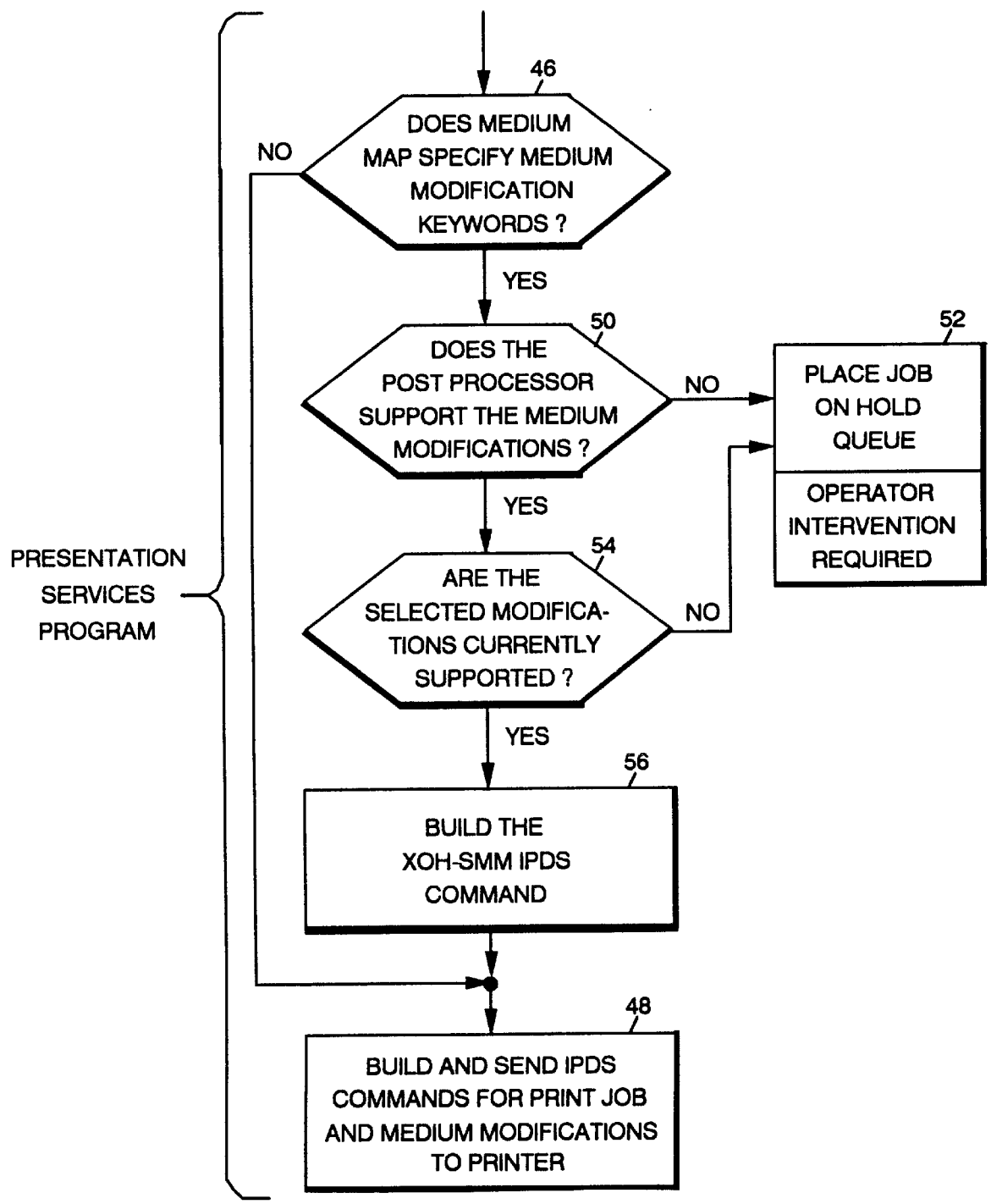
FIG. 3 shows the presentation services program running in the host computer to create the print data stream containing print data, printer control data and post processor control data.

The logical flow of operations performed by the presentation services program to add post processor control data to the print data stream is shown in FIG. 3. The process begins at decision operation 46 that checks whether the medium map specifies modification keywords. If there are no modification keywords indicating no post processor control data is to be added to the printed data stream, the process branches to operation 48. Operation 48 builds the print data stream, which contains print data, printer control data and post processor control data, and sends the IPDS (Intelligent Printer Data Stream) for the print job to the printer.

If there are modification keywords, the process branches to decision operation 50. Decision step 50 tests whether the post processor supports the medium modification indicated by the keywords. If the post processor is not the correct type to support the operations identified by the keywords, the print job is put in a hold queue at operation 52. The operator must then intervene to handle the print job. If the post processor does support the selected modifications, the process flows to decision block 54.

Decision block 54 compares the selected modifications specified by the keywords against the modifications currently supported by the post processor. In test or comparison, the post processor has the capability but may, or may not, be ready. For example, the post processor supports color plate fixed printing, but the post processor has insufficient printing plates or the wrong color ink. If the post processor does not currently support the selected modification operation, the print job is again placed in the hold queue at operation 52. If the answer at decision block 54 is yes, operation 56 then builds the post processor control data, XOH-SMM command for insertion in the print data stream, IPDS. Operation 48 builds the print data stream by building the commands for the printer, and combining the print data, the printer commands and the post processor commands into the print data stream. After building the print data stream, operation 48 sends the print data stream to the printer.

The format of the XOH-SMM command is shown in FIG. 6. Bytes 0 and 1 identify the command as an SMM command. Bytes 2 to 9 are not used. Bytes +0 to +1 (i.e., bytes 10 and 11) indicate length of the command. Byte +2 is a trigger byte for medium modifications and is used to indicate whether medium modification is to be applied or not applied to a sheet or sheets. Bytes +3 and +4 are the keyword identifying the selected modification. Bytes +5 to the end are reserved for modification parameters, if necessary.

Figure 4:
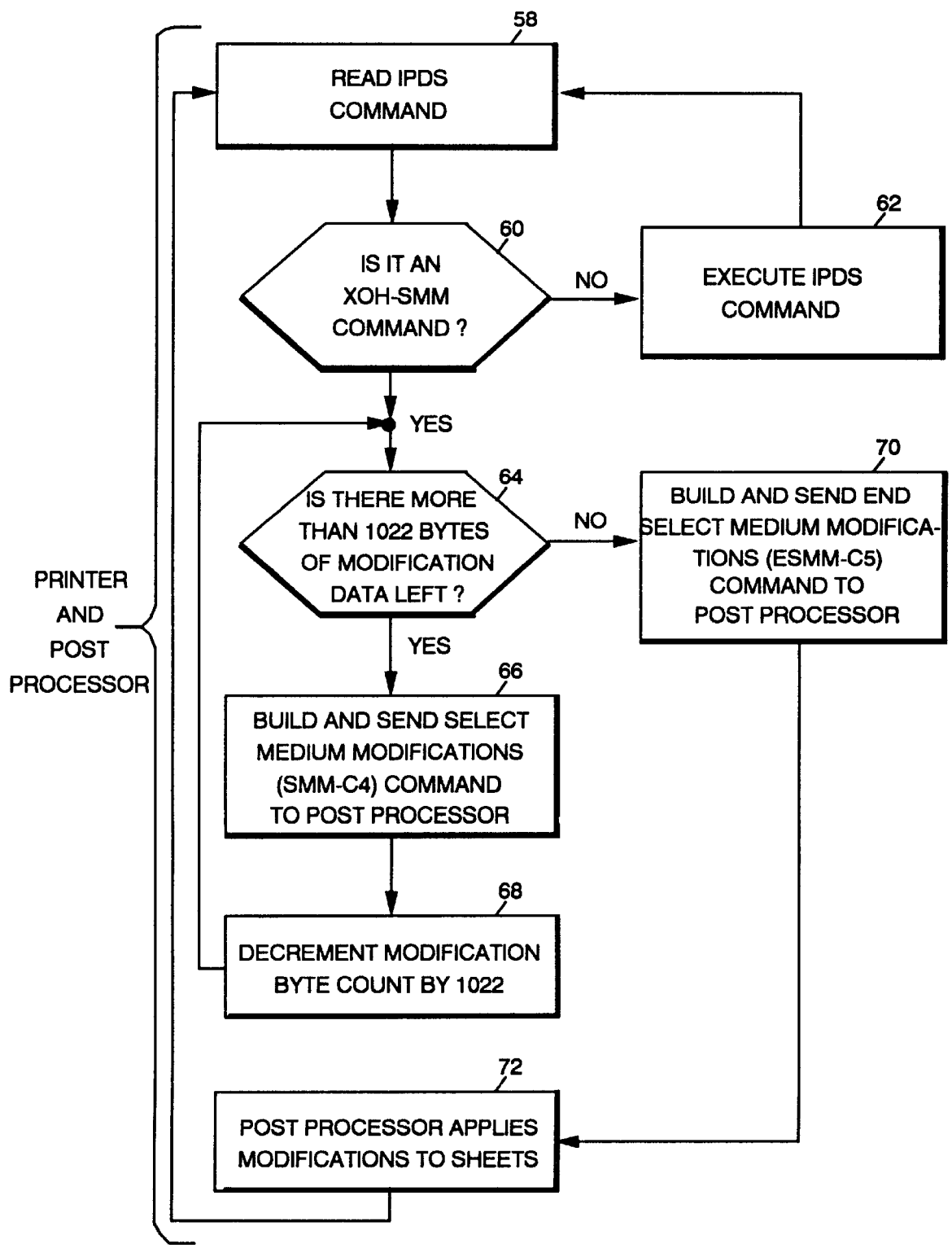
FIG. 4 shows the logical operations of the printer and post processor to interpret and execute the print data stream.

The processing of the print data stream is illustrated in FIG. 4. The printer reads each IPDS command in the print data stream at step 58. Decision operation 60 checks the command code to separate post processor commands from the print data stream. If the command is a XOH-SMM command, it is a command for the post processor. If it is not a XOH-SMM command, it is a printer command and the process branches to operation 62. The printer, at operation 62, executes the printer command using the print data if appropriate to the command (i.e., not all printer commands require print data).

If the read command is a post processor command, decision operation 60 branches the logical flow to operation decision 64. Decision operation 64 tests whether the command has more than 1022 bytes of medium modification data, i.e. not the last medium modification data in the medium modification command. If there are more than 1022 bytes, operation 66 builds and sends 1022 bytes as medium modification command SMM-C4 to the post processor. The medium modification command contains the information of the XOH-SMM command, except the initial SMM command type identifier (i.e., the FIG. 6 format without bytes 0 and 1). After 1022 bytes of the medium modification command is built, the command is sent by operation 66 from the printer controller to the post processor controller. Operation 68 then decrements the modification byte count by 1022 and returns process control to decision 64.

The process loop through steps 64, 66 and 68 continues until decision operation 64 detects the last modification data. The process then branches to operation 70. Operation 70 builds the medium modification command ESMM-C5 in the same manner as operation 68, but also attaches a flag, or signal byte, indicating this is the last data for medium modification command. After the command ESMM-C5 containing the last data is built, operation 70 sends this command from the printer controller to the post processor controller. In operation 72, the post processor controller interprets and executes the medium modification commands.

Figure 5:
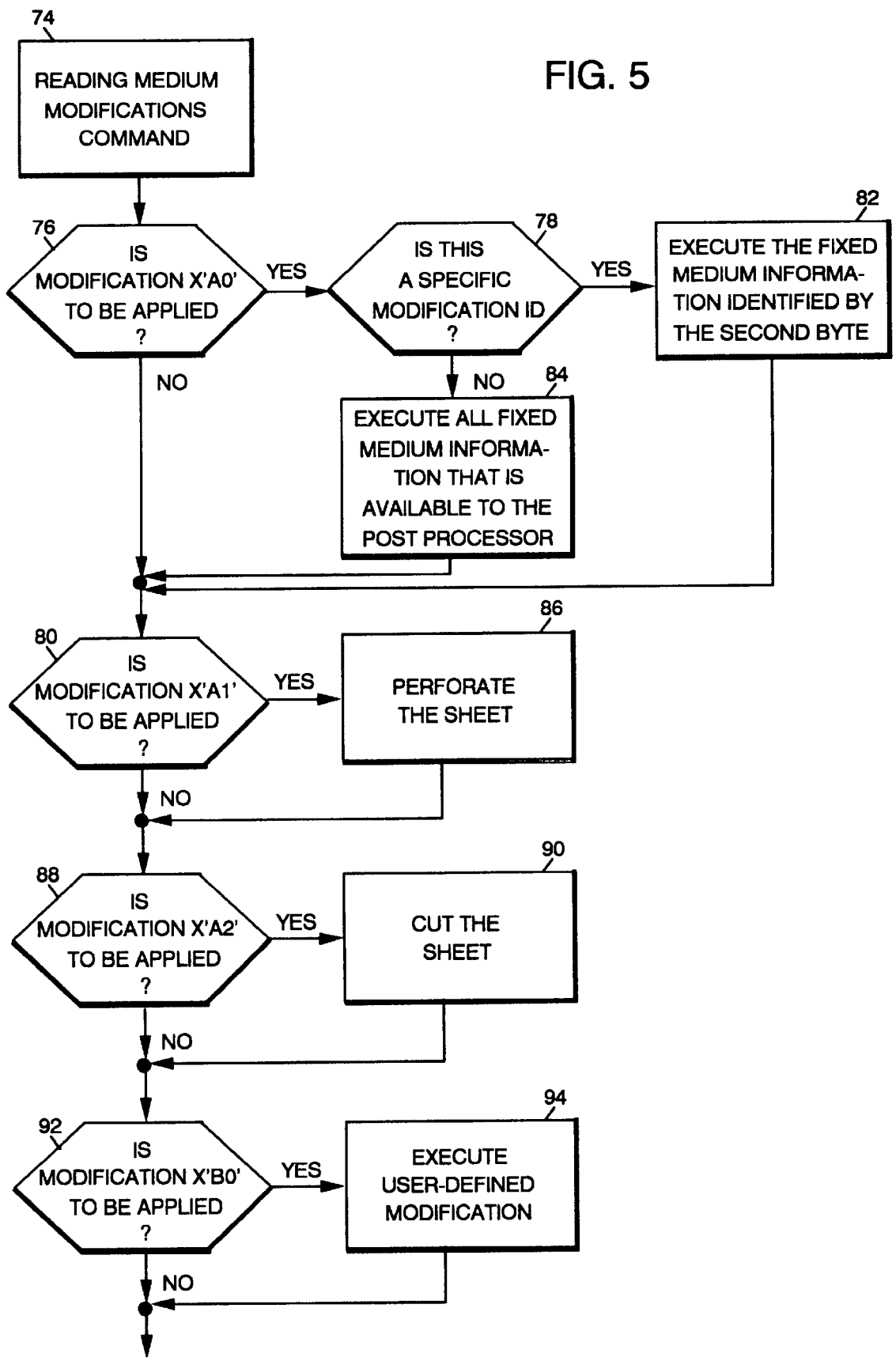
FIG. 5 shows the details of the post processor reading and executing the selected modifications in the post processor control data in the print data stream.

In FIG. 5, the post processor controller first reads the medium modification commands at step 74. Decision 76 determines whether the keyword (i.e., operation identifier) is X'A0', a fixed modification command. If the answer is yes, decision 78 tests the second byte of the keyword to determine if the keyword indicates to execute all medium modifications (byte "FF"), or to execute a specific modification of the medium. If the answer is no at decision operation 76, the process branches to decision operation 80.

If decision step 78 does detect a specific modification, operation 82 modifies the print medium according to the fixed modification. An example of fixed modifications is the printing of fixed information including images, symbols or text using one or more printing plates. Fixed information printing modification may also include printing with color ink. One example might be the printing of a company logo with a color ink normally associated with that logo. If decision 78 detects the byte "FF", then operation 84 executes all the fixed modifications that the post processor supports.

At decision operation 80, the post processor controller determines if the keyword is X'A1' indicating the paper medium is to be perforated. If the selected modification is perforation, the process branches to operation 86 and the sheet is perforated. If the test at decision 80 produces a negative response, decision operation 88 then tests for whether the selected modification requires the sheet to be cut. Again, if the answer is yes, the sheet is cut by the post processor executing operation 90. If the answer to decision 88 is no, the process drops through to decision 92.

Decision operation 92 is provided for the purpose of detecting user-defined modifications, keyword X'B0'. If decision 92 detects a user-defined modification, operation 94 executes the modification in the post processor. User-defined modifications allow the user to set up keywords to identify and select medium modifications in future intelligent post processors. One example of a future post processor medium modification might be variable text printing, rather than fixed printing. The text could be passed in modification parameter bytes available in the medium modification command. Also, the post processor would have to have a variable text printing station. It will be apparent to one skilled in the art that the invention, by providing the user identified modification command, may be readily adapted to features in future intelligent post processors.

While a number of preferred embodiments of the invention have been shown and described, it will be appreciated by one skilled in the art, that a number of further variations or modifications may be made without departing from the spirit and scope of my invention.

What is claimed is:

1. In a computer-controlled printing system having a host computer, an intelligent printer and at least one intelligent post printer processor, a method for providing specific post processing functions to be applied to specific sheets within a print job utilizing a print data stream including print data and printer control data; said method comprising the steps of:

adding post processor control data to the print data stream which post processor control data provides for at least one specific post processing function to be applied to at least one specified sheet within the print job;

reading the print data stream at the intelligent printer;

executing as directed by the print control data printing of print data on a selected print medium at the intelligent printer;

sending said post processor control data to at least one post processor;

reading said post processor control data at the intelligent post processor; and executing said post processor control data at the intelligent post processor to perform selected sheet specific modification of the print medium.

2. The method of claim 1 wherein said step of executing to perform selected sheet specific modification of the print medium includes predetermined fixed modifications, or user defined modifications of said print medium.

3. The method of claim 2 wherein said predetermined fixed modifications include printing of fixed information, perforation of the print medium, or cutting of the print medium.

4. The method of claim 1 wherein said post processor executing step comprises the steps of:

selecting a specific printing plate containing fixed information for printing; and printing the fixed information on the print medium with the selected printing plate.

5. The method of claim 4 and in addition the steps of:

selecting a specific color for the selected printing plate; and printing the fixed information with the selected color on the print medium with the selected printing plate.

6. In a computer-controlled printing system having a host computer, an intelligent printer and at least one intelligent post printer processor with selectable operations for modification of printed sheets, a method for providing specific post processing functions to specific sheets within a print job utilizing a print data stream including print data, and printer control data, said method comprising the steps of:

building for each print job said print data stream at the host computer, said print data stream including print data, and printer control data;

adding post processor control data to said print data stream, which data provides for at least one specific post processing function to be applied to at least one specified sheet within the print job;

reading the print data stream at the intelligent printer;

separating the print data and printer control data from said post processor control data at the printer;

printing at the intelligent printer the print data, in accordance with the printing directions contained within the print control data;

sending said separated post processor control data from the printer to the intelligent post processor;

receiving the post processor control data at the intelligent post printer processor; and modifying at least one of the printed sheets in the print job at the intelligent post printer processor, using the post processor control data to direct modifications to be made to said printed sheet.

7. The method of claim 6 wherein said separating step comprises the steps of:

determining at the intelligent printer if there is post processor control data in the print data stream; and building medium modification commands as post processor control data for the post processor.

8. The method of claim 7 wherein the medium modification commands control selectable modifications of the printed sheets at the post processor, said modifications including predetermined fixed modifications and user defined modifications of the printed sheets.

9. The method of claim 8 wherein said predetermined fixed modifications include printing of fixed information and perforation or cutting of the print medium to separate printed sheets.

10. The method of claim 7 wherein said modifying step comprises the steps of:

selecting a specific printing plate containing fixed information for printing; and printing the fixed information on the print medium with the selected printing plate.

11. The method of claim 10 and in addition the steps of:

selecting a specific color for the selected printing plate; and printing the fixed information with the selected color on the print medium with the selected printing plate.

12. In a computer-controlled printing system having a host computer, an intelligent printer and at least one intelligent post printer processor with selectable operations for modification of printed sheets, apparatus for controlling the application of specific post processing functions to specific sheets within a print job comprising:

means for building for each print job a print data stream, said print data stream including print data and printer control data;

means for insertion of post processor control data to said print data stream, which data provides for at least one specific post processing function to be applied to at least one specified sheet within the print job;

means at the intelligent printer for reading the data stream and separating the print data and printer control data from the post processor control data at the printer;

means at the printer for printing the print data as controlled by the print control data on sheets of the print medium;

means responsive to said separating means for passing the post processor control data from the printer to the intelligent post processor; and means for modifying at least one of the printed sheets in the print job at the intelligent post printer processor, using the post processor control data to direct modifications to be made to said printed sheet.

13. The apparatus of claim 12 wherein said separating means comprises:

means for testing at the printer if there is post processor control data in the print data stream; and means responsive to said testing means for building medium modification commands as post processor control data if there is post processor control data in the print data stream.

14. The apparatus of claim 13 wherein the medium modification commands control selectable modifications of individual selected sheets at the post processor, said modifications including predetermined fixed modifications and user defined modifications of the printed sheets.

15. The apparatus of claim 14 wherein said predetermined fixed modifications include printing of fixed information and perforation or cutting of the printed pages in the print medium.

16. The apparatus of claim 12 wherein said modifying means comprises:

means for selecting a specific printing plate containing fixed information for printing; and means for printing the fixed information on the print medium with the selected printing plate.

17. The apparatus of claim 16 wherein said printing plate prints with color ink.

18. In a computer-controlled printing system having a host computer, an intelligent printer and at least one intelligent post printer processor with selectable operations for modification of printed sheets, a method for providing specific post processing operations to specific sheets within a print job utilizing a print data stream including print data, and printer control data, said method comprising the steps of:

applying to one or more sheets of said print job a post processor control keyword identifying at least one post processor operation to which said sheet will be subjected;

building post processor control data from said post processor control keyword;

adding said post processor control data to said print data stream;

sending said print data stream to the intelligent printer;

separating the print data and printer control data from said post processor control data at the intelligent printer;

printing said print data as controlled by the print control data on sheets of a print medium;

sending said separated post processor control and said sheets to at least one intelligent post printer processor; and modifying said sheets in said intelligent post printer processor according to said separated post processor control data.

19. The method of claim 18 wherein the post processor operations to which said sheets will be subjected and the modifications to said sheets in said intelligent post printer processor include at least one of a group consisting of a fixed perforation, a separation cut, and a user defined modification.

* * * * *